(12) United States Patent
Westberg et al.

(10) Patent No.: US 10,084,605 B2
(45) Date of Patent: Sep. 25, 2018

(54) CACHING OF ENCRYPTED CONTENT

(71) Applicant: Telefonaktiebolaget L M Ericsson (publ), Stockholm (SE)

(72) Inventors: Lars Westberg, Enkoping (SE); Hans Eriksson, Sollentuna (SE); Johan Kolhi, Vaxholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 369 days.

(21) Appl. No.: 14/344,560

(22) PCT Filed: Feb. 14, 2014

(86) PCT No.: PCT/SE2014/050184
§ 371 (c)(1),
(2) Date: Mar. 12, 2014

(87) PCT Pub. No.: WO2015/122813
PCT Pub. Date: Aug. 20, 2015

(65) Prior Publication Data
US 2016/0248587 A1    Aug. 25, 2016

(51) Int. Cl.
*H04L 9/32* (2006.01)
*H04L 29/06* (2006.01)
(Continued)

(52) U.S. Cl.
CPC ........ *H04L 9/3242* (2013.01); *G06F 12/0802* (2013.01); *H04L 9/321* (2013.01);
(Continued)

(58) Field of Classification Search
CPC ..... H04L 63/0823; H04L 63/04; H04L 63/28; H04L 63/08; H04L 63/0281; H04L 63/0263
See application file for complete search history.

(56) References Cited

U.S. PATENT DOCUMENTS 7,076,544 B2* 7/2006 Katz ................ H04L 29/06
709/223
7,937,753 B2* 5/2011 Hodges ............ H04L 63/0428
713/189

(Continued)

OTHER PUBLICATIONS

Written Opinion of the International Preliminary Examining Authority, Application No. PCT/SE2014/050184, dated Dec. 7, 2015, 4 pages.

(Continued)

*Primary Examiner* — Hadi S Armouche
*Assistant Examiner* — Shaqueal D Wade
(74) *Attorney, Agent, or Firm* — Nicholson De Vos Webster & Elliott LLP (57) ABSTRACT

The invention relates to a transparent proxy as well as methods of caching and providing encrypted data content at the transparent proxy. In a first aspect of the present invention, a method of providing requested encrypted data content at a transparent proxy in a communications network is provided. The method comprises receiving from a client an encrypted identifier indicating the requested encrypted data content at the proxy, identifying the encrypted data content from the received encrypted identifier, determining whether the client is authorized to access the encrypted data content, and if so providing the requested encrypted data content to the client.

28 Claims, 6 Drawing Sheets

(51) Int. Cl.
*H04L 29/08* (2006.01)
*G06F 12/0802* (2016.01)

(52) U.S. Cl.
CPC ...... *H04L 63/0281* (2013.01); *H04L 63/0435* (2013.01); *H04L 63/06* (2013.01); *H04L 67/2842* (2013.01); *G06F 2212/402* (2013.01); *G06F 2212/60* (2013.01)

(56) References Cited

U.S. PATENT DOCUMENTS

| | | | | |
|---|---|---|---|---|
| 2004/0015725 | A1* | 1/2004 | Boneh | H04L 63/166 713/160 |
| 2006/0005237 | A1* | 1/2006 | Kobata | H04L 63/0823 726/12 |
| 2009/0300351 | A1* | 12/2009 | Lei | G06F 17/30864 713/165 |
| 2011/0296179 | A1* | 12/2011 | Templin | G06F 21/606 713/168 |
| 2012/0174181 | A1* | 7/2012 | Zhang | G06F 21/10 726/1 |
| 2013/0046883 | A1 | 2/2013 | Lientz et al. | |
| 2014/0129830 | A1* | 5/2014 | Raudaschl | G06F 21/6218 713/165 |

OTHER PUBLICATIONS

International Search Report and Written Opinion, Application No. PCT/SE2014/050184, dated Oct. 14, 2014, 9 pages.
Office Action and Search Report from foreign counterpart Russian Patent Application No. 2016136668/08, dated Nov. 10, 2017, 12 pages.
Notification of Transmittal of the International Preliminary Report on Patentability for Application No. PCT/SE2014/050184, dated Apr. 26, 2016, 20 pages.
Decision to Grant from foreign counterpart Russian Patent Application No. 2016136668, dated May 30, 2018, 8 pages.

* cited by examiner

CACHING OF ENCRYPTED CONTENT

CROSS-REFERENCE TO RELATED APPLICATIONS

This application is a National stage of International Application No. PCT/SE2014/050184, filed Feb. 14, 2014, which is hereby incorporated by reference.

TECHNICAL FIELD

The invention relates to a transparent proxy as well as methods of caching and providing encrypted data content at the transparent proxy, and further a computer program and a computer program product.

BACKGROUND

Transparent Internet Caching (TIC) is an established technology for improving web browsing performance and resource utilization. In TIC, data content can be stored at a transparent proxy server, such as e.g. a Hypertext Transfer Protocol (HTTP) cache, being transparent to an end-user. This is undertaken by intercepting the HTTP traffic and creating a local cache of often requested content typically identified by frequently accessed Uniform Resource Locators (URLs) pointing to the data content. The popular data content is thus transferred to the transparent proxy server from a web server originally providing the content.

For instance, a user at a client browses a web site of a newspaper and requests a particular web page, and is directed to an HTTP proxy where the requested resource in the form of the particular web page is provided, for instance by fetching the web page from a proxy cache, or the HTTP proxy turns to the a web server of the newspaper for the requested resource, receives the resource, and finally provides the resource to the client. The purpose of the proxy is to enhance the user's experience through the faster and better responses it can provide. Further, by caching frequently requested content, the web server is relieved from responding to the requests. The proxy is transparent to the user in that the user does not know (or cares) that he/she is communicating with the proxy, and not with the server. Thus, the transparent proxy server is commonly arranged in a communication path between the client/user and the web server with which the client wishes to communicate in order to reduce response time to the user requests.

Encryption of data traffic over the Internet has drastically increased during the last years. In HTTP 2.0 based on SPDY protocol, URLs are encrypted using Transport Layer Security (TLS) cryptographic protocols. A problem remains in that encryption of URL makes caching of data difficult since the transparent proxy server cannot identify the content.

SUMMARY

An object of the present invention is to solve, or at least mitigate, this problem in the art and provide an improved transparent proxy and a method at a transparent proxy of providing encrypted data content to a client.

This object is attained in a first aspect of the present invention by a method of providing requested encrypted data content at a transparent proxy in a communications network. The method comprises receiving from a client an encrypted identifier indicating the requested encrypted data content at the proxy, identifying the encrypted data content from the received encrypted identifier, determining whether the client is authorized to access the encrypted data content, and if so providing the requested encrypted data content to the client.

This object is further attained by a transparent proxy in a communications network according to the first aspect of the present invention. The proxy comprises a processor and a memory, which memory contains instructions executable by the processor, whereby the proxy is operative to receive from a client an encrypted identifier indicating requested encrypted data content provided at the proxy, to identify the encrypted data content from the received encrypted identifier, and to determine whether the client is authorized to access the encrypted data content. Further, the proxy is operative to provide the requested encrypted data content to the client.

Advantageously, encrypted data content designated by an encrypted identifier, such as e.g. an encrypted URL pointing to the data content, is used to provide security at a transparent proxy. Thus, the encrypted identifier is interpreted at the transparent proxy, however without being decrypted thereby conserving confidentiality, in order for the proxy to know to which particular encrypted data content the client request is made; a great number of encrypted data content is typically stored at the proxy. Further, in order to enhance security, the transparent proxy determines whether the client is authorized to access the encrypted data content. This can be undertaken in various different manners, as will be discussed in the following. For instance, the cryptographic key used to encrypt the identifier designating the encrypted data content must be the same as the key that was used for encrypting the data content. If so, the encrypted data content is provided to the client by the transparent proxy. In this context, it should be noted that the transparent proxy is not capable of decrypting the encrypted data content to provide the data content in clear text.

The object of the present invention is further attained in a second aspect of the present invention by a method of caching requested encrypted data content at a transparent proxy in a communications network. The method comprises receiving from a client an encrypted identifier indicating the requested encrypted data content to be provided at the proxy, determining whether the requested encrypted data content should be cached at the proxy, and sending a request for the encrypted data content to a server providing the encrypted data content. Thereafter, the requested encrypted data content is associated with the received encrypted identifier and cached at the proxy.

Moreover, the object is attained by a transparent proxy in a communications network according to the second aspect of the present invention. The proxy comprises a processor and a memory, which memory contains instructions executable by the processor, whereby the proxy is operative to receive from a client an encrypted identifier indicating requested encrypted data content to be provided at the proxy, to determine whether the requested encrypted data content should be cached at the proxy, and to send a request for the encrypted data content to a server providing the encrypted data content. Further, the proxy is operative to associate the requested encrypted data content with the received encrypted identifier and to cache the requested encrypted data content at the proxy.

Advantageously, encrypted data content designated by an encrypted identifier, such as e.g. an encrypted URL pointing to the data content, is used to provide security at a transparent proxy. Thus, the encrypted identifier is interpreted at the transparent proxy, however without being decrypted thereby conserving confidentiality, in order for the proxy to know to which particular encrypted data content the client request is made; a great number of encrypted data content is typically stored at the proxy. Further, in case the requested encrypted data content is not stored at the proxy, the proxy determines whether in fact it should be stored. If so, the transparent proxy fetches the requested encrypted data content from the a server designated by the encrypted identifier, whereby the encrypted data content is received by the proxy from the server and associated with the encrypted identifier (e.g. the encrypted URL), and caches the encrypted data content such that it subsequently can be provided to a requesting client. Again, the transparent proxy does not have access to the data content in clear text, but only to the encrypted version, thereby providing an appropriate degree of confidentiality.

Thus, a group of data content are considered as "allowed for caching", for instance a group of data content provided by one and the same content provider, or a group of data content provided by one and the same content server. Consequently, in an embodiment of the present invention, all identifiers (e.g. URLs) and the corresponding data content belonging to the same group can be encrypted with the same encrypted key, thereby providing security while still easing the burden for the transparent proxy to identify encrypted data content from encrypted identifiers designating the encrypted content. The encrypted identifiers may be interpreted using well known deep packet inspection (DPI) methods or HTTP protocol information in order to identify the corresponding encrypted data content without actually decrypting the encrypted identifiers.

In a further embodiment of the present invention, it is determined at the transparent proxy that the requested encrypted data content should be cached at the proxy if the number of requests for the encrypted data content exceeds a request threshold value. Thus, much requested encrypted data content are advantageously cached at the transparent proxy. This embodiment will further advantageously allow the transparent proxy to detect that the same URL (even if encrypted) is requested many times and with that information (the same encrypted URL) understand that encrypted data content designated by that URL should be cached. It should be noted that the data content not necessarily are static but in practice oftentimes are dynamic, such as for instance news information provided by a newspaper web server. Again, the proxy does not know the cleartext URL or the cleartext data content, but is still capable of caching the encrypted data content and associating it with its encrypted identifier.

As can be deducted from the above, the present invention allows transparent caching of encrypted URLs and correspondingly designated encrypted data content in e.g. HTTP 2.0. The caching is more secure as the proxy neither knows the actual, clear text URL address nor the corresponding encrypted data content. Only clients capable of verifying their right to access a particular encrypted data content (e.g. by means of proving that they in fact have access to the encryption key for instance by presenting a key identifier). A content provider can thus advantageously control a client's access to encrypted data content in a simple and straightforward yet secure manner.

In a further advantageous embodiment of the present invention, encrypted data content is flushed from the cache of the proxy if it has not been requested for some time period. The content provider could thus change encryption key to improve security, and the data content encrypted with the "old" encryption key will thus be removed from the cache since it is no longer requested; even if the URL would be selected to be the same for a new encrypted data content as for a previously stored data content encrypted with the old key, the identifier created by means of encrypting the URL with the new key would differ.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
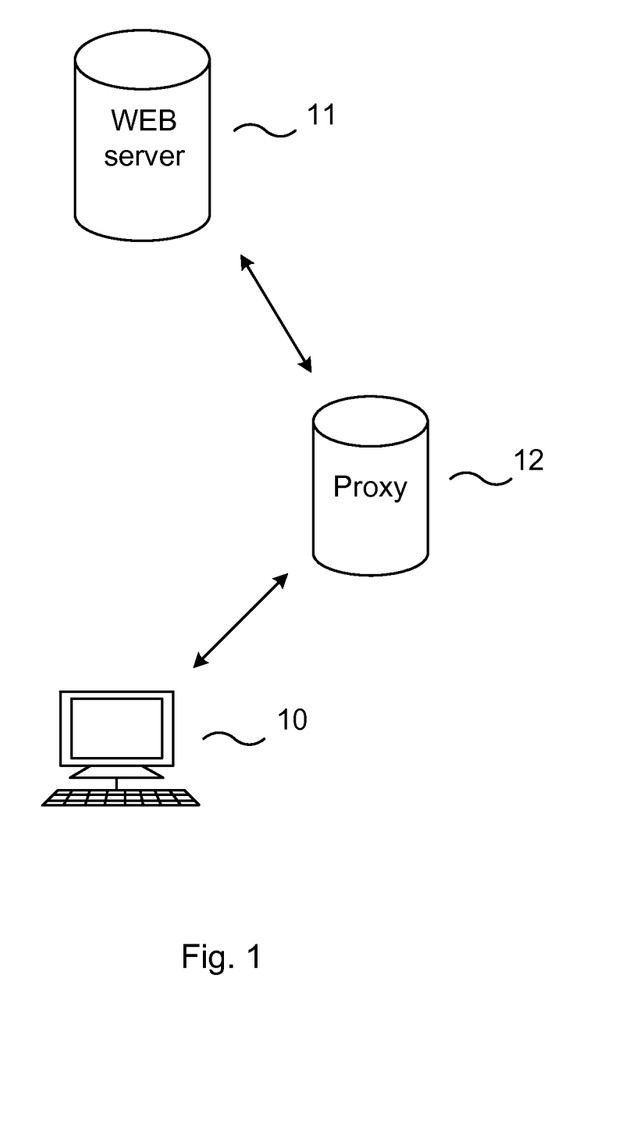
FIG. 1 illustrates a communications network in which the present invention may be implemented.

FIG. 1 illustrates a communications network in which the present invention may be implemented comprising a client 10, a web server ii, and a transparent proxy 12 providing resources on behalf of the web server ii. The web server will in the following be referred to as "the server". The client 10 is a network node typically embodied in the form of user equipment (UE) such as a mobile phone, a personal digital assistant (PDA), a smart phone, a tablet, a laptop, a media player, etc.

For instance, a user at the client 10 browses a web site of a newspaper and requests a particular web page, and is directed to the proxy 12 where the requested resource in the form of the particular web page is provided, for instance by fetching the web page from a proxy cache, or the proxy 12 turns to the server ii for the requested resource, receives the resource, and finally provides the resource to the client 10. The purpose of the proxy is to enhance the user's experience through the faster and better responses it can provide. The proxy is transparent to the user in that the user does not know (or cares) that he/she is communicating with the proxy 12, and not with the server 11.

An example of a proxy is a caching proxy which speeds up service requests of clients by retrieving, from the server 11, content saved from a previous request made by the same client or even other clients. Thus, caching proxies advantageously store local copies of frequently requested resources, allowing reduction of client bandwidth usage (typically a great number of clients are routed via the caching proxy, such as e.g. all users in a larger enterprise), while increasing performance.

Figure 2A:
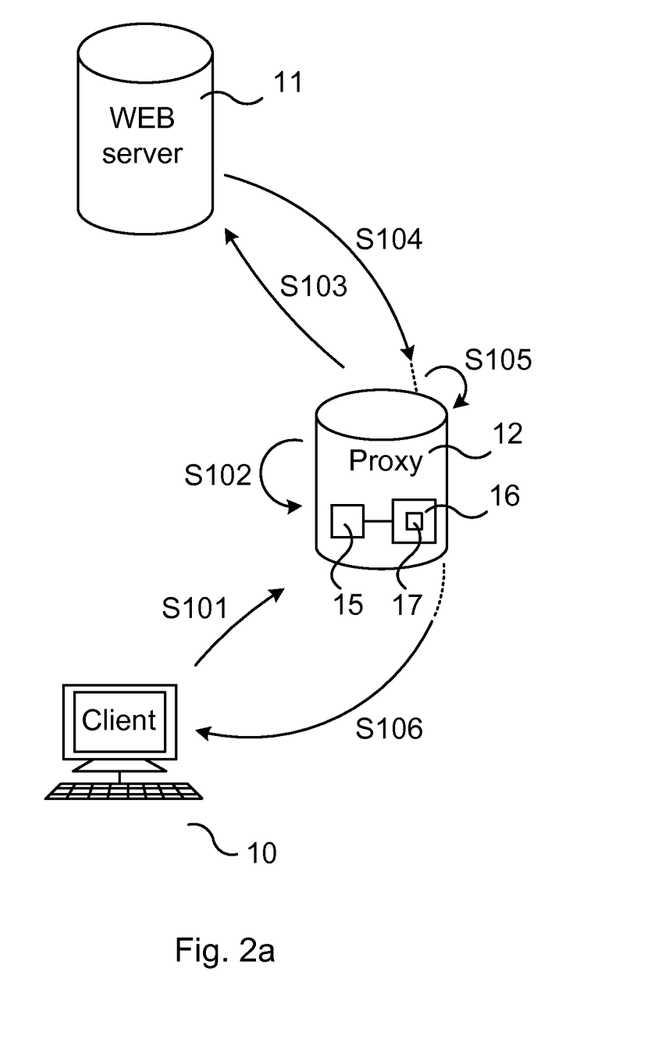
FIG. 2a illustrates a transparent proxy according to an embodiment of the present invention.
Figure 2B:
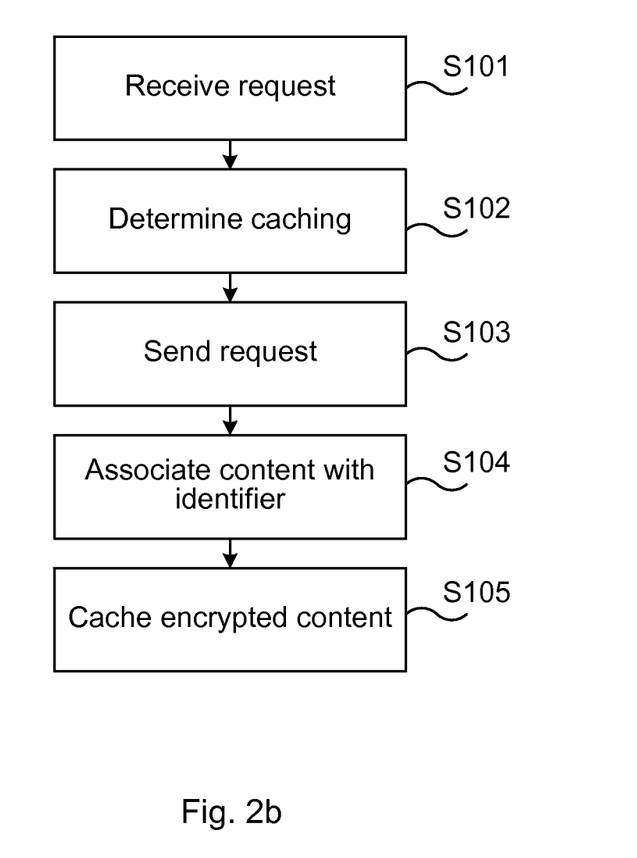
FIG. 2b illustrates a flowchart of a method at the transparent proxy of FIG. 2a according to an embodiment of the present invention.

FIGS. 2a and 2b respectively illustrates a transparent proxy 12 according to an embodiment of the present invention, and a flowchart of a method at a transparent proxy in a communications network according to an embodiment of the present invention. FIGS. 2a and 2b illustrate an embodiment of an aspect of the invention where data content requested by the client 10 yet not has been cached at the transparent proxy 12. The method at the proxy 12 is typically performed by a processing unit 15 embodied in the form of one or more microprocessors arranged to execute a computer program 17 downloaded to a suitable storage medium 16 associated with the microprocessor, such as a Random Access Memory (RAM), a Flash memory or a hard disk drive. The processing unit 15 is arranged to at least partly carry out the method according to embodiments of the present invention when the appropriate computer program 17 comprising computer-executable instructions is downloaded to the storage medium 16 and executed by the processor 15. The storage medium 16 may also be a computer program product comprising the computer program 17. Alternatively, the computer program 17 may be transferred to the storage medium 16 by means of a suitable computer program product, such as a Digital Versatile disc (DVD) or a memory stick. As a further alternative, the computer program 17 may be downloaded to the storage medium 16 over a network. The processing unit 15 may alternatively be embodied in the form of an application specific integrated circuit (ASIC), a field-programmable gate array (FPGA), a complex programmable logic device (CPLD), a digital signal processor (DSP), etc.

Thus, with reference to FIGS. 2a and 2b, a user at the client 10 requests data content, for instance by using a browser at the client 10 to access a home page hosted by the web server 11. Since communication is required to be secure, at least a part of the HTTP request is encrypted at the client 10 before being submitted by using an encryption key which is common with that used at the web server ii for encrypting the requested data content. The transparent proxy 12 receives in step S101 the request for data content, which comprises an encrypted identifier designating the requested data content. In in example, the encrypted identifier is an encrypted URL addressing the requested data content. The proxy 12 uses e.g. DPI for interpreting the encrypted URL in order to be able to address the web server 11 (or as will be described, to fetch the requested encrypted data content from a local cache).

Hence, due to confidentiality requirements, the proxy 12 is not capable of decrypting the encrypted URL but uses DPI or any other appropriate approach for addressing the destination of the request, i.e. the web server 11. When receiving the request. The proxy 12 determines in step S102 whether the requested content should be cached, typically as a result of the data content being frequently requested. If that is the case for this particular requested data content (and given that the requested data content is not already cached at the proxy), the proxy 12 sends in step S103 a request for the encrypted data content to the web server 11 providing the encrypted data content in accordance with the encrypted URL comprised in the request previously sent by the client 10 to the proxy 12. It should be noted that the web server 11 is capable of decrypting the encrypted URL, as well as stored encrypted data content. In step S104, the proxy receives the requested encrypted data content and associates the encrypted data content with the previously received encrypted URL and stores the encrypted data content in a cache 16. It is also possible that a hashing operation is performed on the encrypted URL at the proxy 12 to produce an identifier identifying the requested content. Subsequently, the encrypted data content may be provided by the proxy 12 to the client 10 in step S105.

Figure 3A:
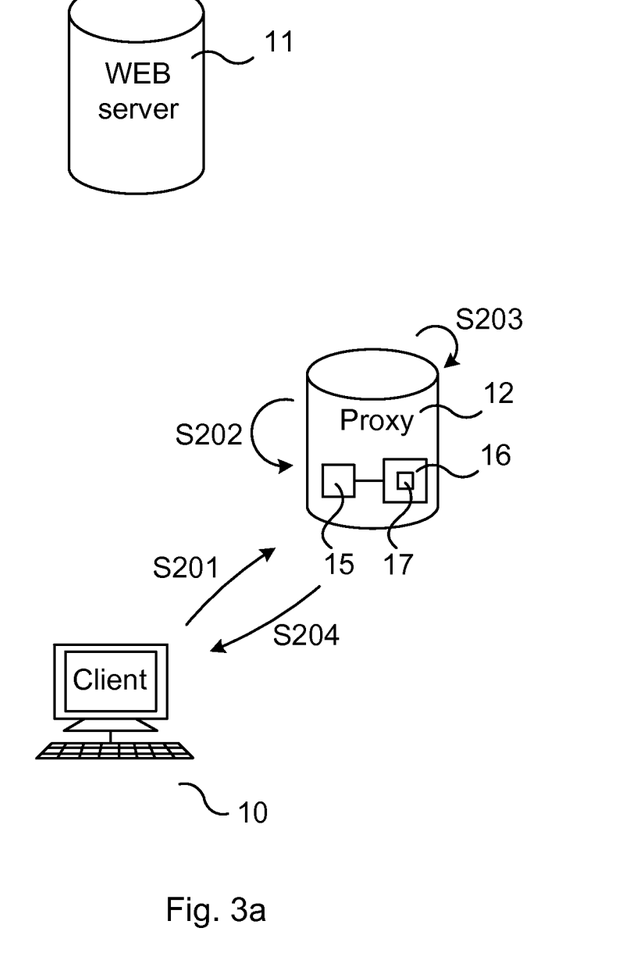
FIG. 3a illustrates a transparent proxy according to a further embodiment of the present invention.
Figure 3B:
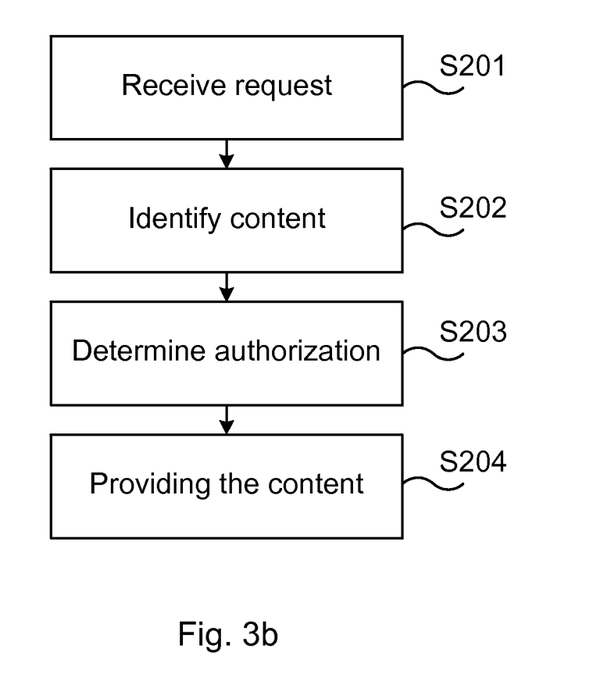
FIG. 3b illustrates a flowchart of a method at the transparent proxy of FIG. 3a according to a further embodiment of the present invention.

FIGS. 3a and 3b respectively illustrates a transparent proxy 12 according to a further embodiment of the present invention, and a flowchart of a method at a transparent proxy in a communications network according to an embodiment of the present invention. FIGS. 3a and 3b illustrate an embodiment of an aspect of the invention where data content requested by the client 10 has been cached at the transparent proxy 12, as was described with reference to FIGS. 2a and 2b. The method at the proxy 12 is typically performed by a processing unit 15 embodied in the form of one or more microprocessors arranged to execute a computer program 17 downloaded to a suitable storage medium 16 associated with the microprocessor as described in detail in the above.

Thus, with reference to FIGS. 3a and 3b, a user at the client 10 requests data content, for instance by using a browser at the client 10 to access a home page hosted by the web server 11. Since communication is required to be secure, at least a part of the HTTP request is encrypted at the client 10 before being submitted by using an encryption key which is common with the encryption key that initially was used at the web server 11 for encrypting the requested data content. The transparent proxy 12 receives in step S201 the request for data content, which comprises an encrypted identifier designating the requested data content. In an example, the encrypted identifier is an encrypted URL addressing the requested data content. It is further possible that a hashing operation is performed on the encrypted URL at the proxy 12 to produce an identifier identifying the requested content. The proxy 12 uses e.g. DPI for interpreting the encrypted URL in step S202 in order to be able to fetch the requested encrypted data content from the local cache 16. Hence, due to confidentiality requirements, the proxy 12 is not capable of decrypting the encrypted URL but uses DPI or any other appropriate approach for addressing the destination of the request, i.e. the particular address(es) in the cache 16 where the requested encrypted data content is stored. In step S203, it is determined whether the client 10 in fact is authorized to access the requested encrypted data content. This can be undertaken in various different manners, as will be discussed in the following. For instance, the cryptographic key used to encrypt the identifier designating the encrypted data content must be the same as the key that was used for encrypting the data content. This may be indicated by means of a numeric key identifier included in the request. If the client 10 is authorized, the encrypted data content is provided to the client 10 by the proxy 12 in step S204.

In traditional caching systems, it is possible to specify data sharing classes for different data content. Currently, following classes are possible:

a. Public shared content, used for instance in applications relating to Digital Rights Management (DRM) where intermediates should not be capable of modifying data content, b. Private content, and c. Private and shared, associated for a group of end-users.

The present invention is well suited for handling these different data sharing classes by using different encryption approaches depending on the selected data sharing class:

a. "Public shared content" are allocated with the same encryption key for a particular data content, i.e. the same encryption key are utilized for all clients to access the same URL. This may be used in a relatively large group, such as an organization comprising hundreds or even thousands of people.

b. "Private content" have an individual encryption key per client and URL, i.e. only a single user is capable of accessing data content located at a particular URL.

c. "Private and shared" have a unique encryption key per client group and URL, i.e. a limited number of clients are capable of accessing data content located at a particular URL. This is typically a smaller group than that under a "Public shared content", such as a team within an large organization.

As previously mentioned, the same encryption key is typically used for encrypting the identifier (i.e. URL) and the data content addressed by the identifier.

It should be noted that the proxy 12 could be associated with different web servers, or domains, one of which is embodied by the server ii. A way for the proxy 12 to distinguish between different domains is to use the so called fully qualified domain name (FQDN). The domain name may be associated with encryption key in order for the proxy 12 to identify different domains.

In a further embodiment of the present invention, in order to determine whether a client is authorized to access encrypted data content, an International Mobile Subscriber Identity (IMSI) of the client is used. Thus, when determining whether the client is authorized to receive requested encrypted data content, the proxy compares the IMSI with a previously registered list of IMSIs supplied by the web server to indicate which clients should be entrusted with the encrypted data content cached at the proxy. However, it should be noted that other unique client identifiers could be used, such as Media Access Control (MAC) address, Network Access Identifier (NAI) address (e.g. "yourname@mydomain"), or client device serial number, or any other appropriate unencrypted parameter added to the request by the client.

Figure 4A:
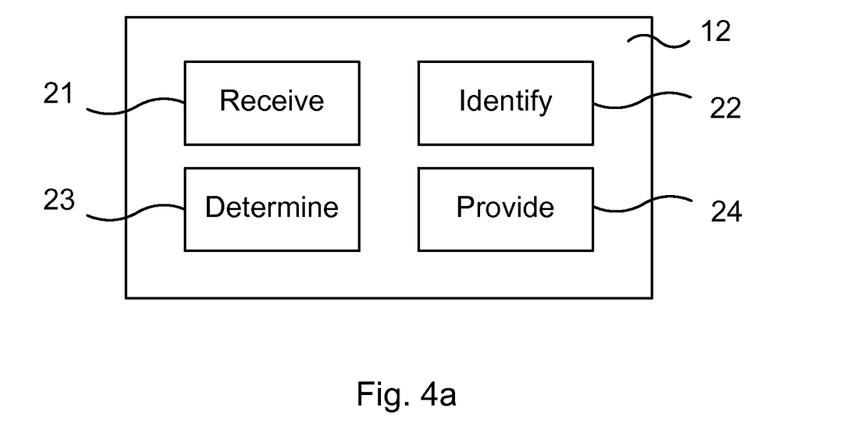
FIG. 4a illustrates a proxy according to another embodiment of the present invention.

FIG. 4a shows a transparent proxy 12 according to an embodiment of the first aspect of the present invention. The proxy 12 comprises receiving means 21 adapted to receive, from a client, an encrypted identifier indicating requested encrypted data content at the proxy, and identifying means 22 adapted to identify the encrypted data content from the received encrypted identifier. The receiving means 21 may comprise a communications interface for receiving and providing information to the client, and/or for receiving and providing information to other devices, such as a server. Further, the proxy 12 comprises determining means 23 adapted to determine whether the client is authorized to access the encrypted data content. Moreover, the proxy 12 comprises providing means 24 adapted to providing the requested encrypted data content to the client. The providing means 24 may comprise a communications interface for providing information to the client, and/or for providing information to other devices, or share communications interface with the receiving means 21. The providing means 24 may further comprise a local storage for caching data. The receiving means 21, identifying means 22, determining means 23 and providing means 24 may (in analogy with the description given in connection to FIG. 2a) be implemented by a processor embodied in the form of one or more microprocessors arranged to execute a computer program downloaded to a suitable storage medium associated with the microprocessor, such as a RAM, a Flash memory or a hard disk drive. The receiving means 21 and providing means 24 may comprise one or more transmitters and/or receivers and/or transceivers, comprising analogue and digital components and a suitable number of antennae for radio communication.

Figure 4B:
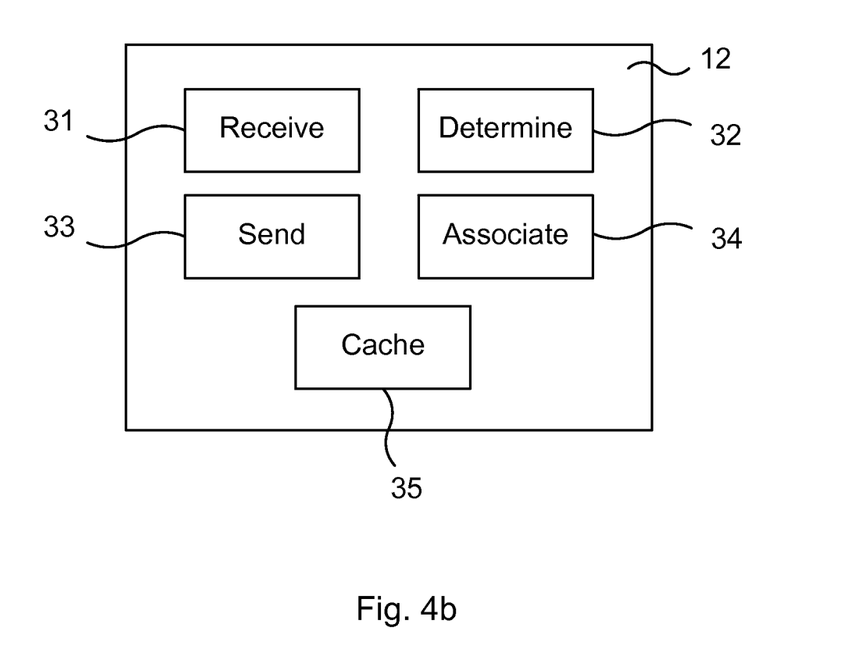
FIG. 4b illustrates a proxy according to yet another embodiment of the present invention.

FIG. 4b shows a transparent proxy 12 according to an embodiment of the second aspect of the present invention. The proxy 12 comprises receiving means 31 adapted to receive, from a client, an encrypted identifier indicating requested encrypted data content to be provided at the proxy, and determining means 32 adapted to determine whether the requested encrypted data content should be cached at the proxy. The receiving means 31 may comprise a communications interface for receiving and providing information to the client, and/or for receiving and providing information to other devices, such as a server.

Further, the proxy 12 comprises sending means 33 adapted to send a request for the encrypted data content to a server providing the encrypted data content, and associating means 34 adapted to associate the requested encrypted data content with the received encrypted identifier. The sending means 33 may comprise a communications interface for providing information to the server, and/or for providing information to other devices, or share communications interface with the receiving means 21. The proxy 12 also comprises caching means 35 adapted to cache the requested encrypted data content received from the server at the proxy. The caching means 35 may further comprise a local storage for caching data. The receiving means 31, determining means 32, sending means 33, associating means 34 and caching means 35 may (in analogy with the description given in connection to FIG. 2a) be implemented by a processor embodied in the form of one or more microprocessors arranged to execute a computer program downloaded to a suitable storage medium associated with the microprocessor, such as a RAM, a Flash memory or a hard disk drive. The receiving means 31 and sending means 33 may comprise one or more transmitters and/or receivers and/or transceivers, comprising analogue and digital components and a suitable number of antennae for radio communication.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of providing requested encrypted data content at a transparent proxy in a communications network, comprising:

receiving, from a client, a request for encrypted data content hosted by a server and cached at the transparent proxy, the request including an encrypted identifier of the requested encrypted data content;

identifying, by the transparent proxy, the encrypted data content cached at the transparent proxy using the received encrypted identifier and without decrypting the received encrypted identifier, wherein the encrypted data content, when cached at the transparent proxy, has been encrypted based on an encryption key that is the same as the encryption key used to encrypt the received encrypted identifier;

determining that the client is authorized to access the encrypted data content; and providing the requested encrypted data content to the client.

2. The method of claim 1, wherein the encrypted identifier comprises an encrypted Universal Resource Locator (URL).

3. The method of claim 1, wherein all clients requesting the encrypted data content use the same encryption key to encrypt the encrypted identifier indicating the encrypted data content.

4. The method of claim 1, wherein a group of clients requesting the encrypted data content uses the same encryption key to encrypt the encrypted identifier indicating the encrypted data content.

5. The method of claim 1, wherein each client requesting the encrypted data content uses an individual encryption key to encrypt the encrypted identifier indicating the encrypted data content.

6. The method of claim 1, wherein the determining that the client is authorized to access the encrypted data content comprises:
verifying that a client identifier received from the client matches a client identifier received from a server providing the requested encrypted data content to the transparent proxy.

7. The method of claim 6, wherein the client identifier is one or more of an International Mobile Subscriber Identity (IMSI), a Media Access Control (MAC) address, a Network Access Identifier (NAI) address, or a client device serial number.

8. The method of claim 1, wherein determining that the client is authorized to access the encrypted data content comprises:
verifying that the client has access to the encryption key used to encrypt the encrypted identifier and the encrypted data content.

9. The method of claim 1, further comprising the step of:
performing a hashing operation on the encrypted identifier, wherein the encrypted data content is identified from the hashed encrypted identifier.

10. A method of caching requested encrypted data content at a transparent proxy in a communications network, comprising:
receiving, from a client, a request for encrypted data content hosted by a server, the request including an encrypted identifier of the requested encrypted data content to be cached at the transparent proxy;
determining, based on the received encrypted identifier and without decrypting the received encrypted identifier, that the requested encrypted data content should be cached at the transparent proxy, wherein the encrypted data content, when cached at the transparent proxy, has been encrypted based on an encryption key that is the same as the encryption key used to encrypt the received encrypted identifier;
sending a request for the encrypted data content to the server hosting the encrypted data content;
associating the requested encrypted data content with the received encrypted identifier; and
caching the requested encrypted data content at the transparent proxy.

11. The method of claim 10, wherein determining that the requested encrypted data content should be cached at the transparent proxy includes determining that a number of requests for the encrypted data content exceeds a request threshold value.

12. The method of claim 10, wherein a selected group of encrypted data content and a corresponding group of encrypted identifiers identifying a respective encrypted data content are encrypted with the same cryptographic key.

13. The method of claim 10, further comprising:
determining that the encrypted data content has not been requested for a predetermined time period; and
removing the encrypted data content from the transparent proxy.

14. A transparent proxy in a communications network comprising: a processor and a memory, said memory containing instructions executable by said processor, wherein execution of said instructions causes said transparent proxy to:
receive, from a client, a request for encrypted data content hosted by a server and cached at the transparent proxy, the request including an encrypted identifier of requested encrypted data content;
identify, by the transparent proxy, the encrypted data content cached at the transparent proxy using the received encrypted identifier and without decrypting the received encrypted identifier, wherein the encrypted data content, when cached at the transparent proxy, has been encrypted based on an encryption key that is the same as the encryption key used to encrypt the received encrypted identifier;
determine that the client is authorized to access the encrypted data content; and
provide the requested encrypted data content to the client.

15. The transparent proxy of claim 14, wherein execution of the instructions further causes the transparent proxy to determine that the client is authorized to access the encrypted data content by verifying that the client has access to the encryption key used to encrypt the encrypted identifier and the data content.

16. The transparent proxy of claim 14, wherein execution of the instructions further causes the transparent proxy to determine that the client is authorized to access the encrypted data content by verifying that a client identifier received from the client matches a client identifier received from a server that provides the requested encrypted data content to the transparent proxy.

17. A transparent proxy in a communications network comprising: a processor and a memory, said memory containing instructions executable by said processor, wherein execution of said instructions causes said transparent proxy to:
receive, from a client, a request for encrypted data content hosted by a server, the request including an encrypted identifier of requested encrypted data content to be cached at the transparent proxy;
determine, based on the received encrypted identifier and without decrypting the received encrypted identifier, that the requested encrypted data content should be cached at the transparent proxy, wherein the encrypted data content, when cached at the transparent proxy, has been encrypted based on an encryption key that is the same as the encryption key used to encrypt the received encrypted identifier;
send a request for the encrypted data content to the server hosting the encrypted data content;
associate the requested encrypted data content with the received encrypted identifier; and
cache the requested encrypted data content at the transparent proxy.

18. The transparent proxy of claim 17, wherein the transparent proxy determining that the requested encrypted data content should be cached at the transparent proxy includes determining that a number of requests for the encrypted data content exceeds a request threshold value.

19. The transparent proxy of claim 17, the transparent proxy further operative to: determine that the encrypted data content has not been requested for a determined time period; and remove the encrypted data content from the transparent proxy.

20. A non-transitory computer-readable storage medium storing instructions that when executed by one or more processors, cause the one or more processors to perform as follows:

receive, from a client, a request for encrypted data content hosted by a server and cached at a transparent proxy, the request including an encrypted identifier of the requested encrypted data content;

identify, by the transparent proxy, the encrypted data content cached at the transparent proxy using the received encrypted identifier and without decrypting the received encrypted identifier, wherein the encrypted data content, when cached at the transparent proxy, has been encrypted based on an encryption key that is the same as the encryption key used to encrypt the received encrypted identifier;

determine that the client is authorized to access the encrypted data content; and provide the requested encrypted data content to the client.

21. The non-transitory computer-readable storage medium of claim 20, further comprising instructions that determine that the client is authorized to access the encrypted data content, the instructions when executed by the one or more processors, cause the one or more processors to perform the following:

verify that the client has access to the cryptographic encryption key used to encrypt the encrypted identifier and the encrypted data content.

22. The non-transitory computer-readable storage medium of claim 20, further comprising instructions that when executed by the one or more processors, cause the one or more processors to also perform a hash operation on the encrypted identifier, wherein the encrypted data content is identified from the hashed encrypted identifier.

23. The non-transitory computer-readable storage medium of claim 20, wherein the encrypted identifier comprises an encrypted Universal Resource Locator (URL).

24. The non-transitory computer-readable storage medium of claim 20, wherein all clients requesting the encrypted data content use the same encryption key to encrypt the encrypted identifier indicating the encrypted data content.

25. The non-transitory computer-readable storage medium of claim 20, wherein a group of clients requesting the encrypted data content uses the same encryption key to encrypt the encrypted identifier indicating the encrypted data content.

26. The non-transitory computer-readable storage medium of claim 20, wherein each client requesting the encrypted data content uses an individual encryption key to encrypt the encrypted identifier indicating the encrypted data content.

27. The non-transitory computer-readable storage medium of claim 20, wherein the instructions that cause the one or more processors to determine that the client is authorized to access the encrypted data content further comprise instructions that when executed cause the one or more processors to verify that a client identifier received from the client matches a client identifier received from a server providing the requested encrypted data content to the transparent proxy.

28. The non-transitory computer-readable storage medium of claim 27, wherein the client identifier is one or more of an International Mobile Subscriber Identity (IMSI), a Media Access Control (MAC) address, a Network Access Identifier (NAI) address, or a client device serial number.

* * * * *

UNITED STATES PATENT AND TRADEMARK OFFICE
CERTIFICATE OF CORRECTION

PATENT NO. : 10,084,605 B2
APPLICATION NO. : 14/344560
DATED : September 25, 2018
INVENTOR(S) : Westberg et al.

It is certified that error appears in the above-identified patent and that said Letters Patent is hereby corrected as shown below:

In Column 1, Line 35, delete "the a web" and insert -- the web --, therefor.

In Column 4, Line 49, delete "web server ii," and insert -- web server 11, --, therefor.

In Column 4, Line 50, delete "web server ii." and insert -- web server 11. --, therefor.

In Column 4, Line 61, delete "server ii" and insert -- server 11 --, therefor.

In Column 5, Line 46, delete "web server ii" and insert -- web server 11 --, therefor.

In Column 7, Line 25, delete "server ii." and insert -- server 11. --, therefor.

In Column 11, Lines 35-36, in Claim 21, delete "cryptographic encryption" and insert -- encryption --, therefor.

Signed and Sealed this
Fourth Day of December, 2018

Andrei Iancu
*Director of the United States Patent and Trademark Office*